Patented Dec. 7, 1948

2,455,652

UNITED STATES PATENT OFFICE 2,455,652

NUCLEAR HALOGENATED 4,4'-BIS-(ALKENYL CARBONATO) DIPHENYL ALKANES AND POLYMERS THEREOF

James A. Bralley, Akron, and Frank B. Pope, Cuyahoga Falls, Ohio, assignors to The B. F. Goodrich Company, New York, N. Y., a corporation of New York No Drawing. Application February 21, 1945, Serial No. 579,163

14 Claims. (Cl. 260—77.5)

This invention relates to new chemical compounds and pertains more specifically to certain unsaturated diesters which are capable of polymerization to form non-thermoplastic polymers, and to the polymers obtained by such polymerization.

The unsaturated diesters of this invention are those prepared by reacting a nuclear-halogenated alkylidene bis-phenol with phosgene and with an alkenol having a methylene group attached by a double bond to a carbon atom. These materials possess the property of polymerizing readily, particularly in the presence of organic peroxide catalysts, to form hard, tough, non-thermoplastic resinous solid materials. The materials are unusual in that very little shrinkage, less than about 4%, takes place during the polymerization. This property, of course, renders the material extremely valuable for use as molding resins of the thermosetting variety, making it possible to produce molded objects of accurate dimensions free from strain, in contrast to other unsaturated diesters which shrink as much as 15 to 25% or more during the polymerization reaction and can find no application for this purpose.

Any of the alkylidene bis-phenols may be used to prepare the products of this invention. They may be halogenated by the methods described by Zincke et al., Ann. 343, 75–131 (1905) or by Moss, British Patent 491,792; or if desired, they may be prepared by reacting a previously halogenated phenol with an aldehyde or ketone in the usual manner. Among the materials which may be used are: bis-(4-hydroxyphenyl) methane; 2,2-bis-(4-hydroxyphenyl) propane; 2,2-bis-(4-hydroxyphenyl) butane; 2,2-bis-(4-hydroxyphenyl)-4-methyl pentane; 2,2-bis-(3-methyl-4-hydroxyphenyl) propane; 2,2-bis-(3-phenyl-4-hydroxyphenyl) propane; 2,2-bis-(4-hydroxyphenyl) heptane; and the like. An example of a bis-phenol prepared from a halogenated phenol is 2,2-bis-(3-chloro-4-hydroxyphenyl) propane prepared by reacting o-chlorophenol with acetone.

The halogenation of the foregoing bis-phenols is readily controlled so as to introduce from 1 to 4 halogen atoms into each phenolic nucleus, as desired.

Although, as has been pointed out in the foregoing paragraphs, alkylidene bis-phenols having a variety of additional substituents in the benzene rings in addition to the hydroxyl group, may be employed to prepare the compounds of this invention, the starting materials which produce the compounds which are most useful as molding materials are the bis-phenols which contain no substituent groups in the aromatic nuclei in addition to hydroxyl and halogen groups, that is, compounds having the structure:

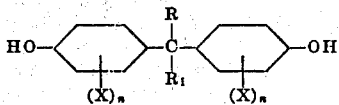

in which R and R' are hydrogen or alkyl groups, X is halogen, and $n$ is an integer less than 5.

Although as many as four halogen atoms may be introduced into each of the phenolic nuclei of such a compound, products having only one or two halogen atoms in each of the nuclei are preferred because of their lower melting points.

The nuclear-halogenated bis-phenols may be converted into the desired diesters by reaction with two molecular proportions of phosgene to form the di-chloroformate, followed by reaction of the product with two molecular proportions of the desired unsaturated alcohol, as shown in the following equation:

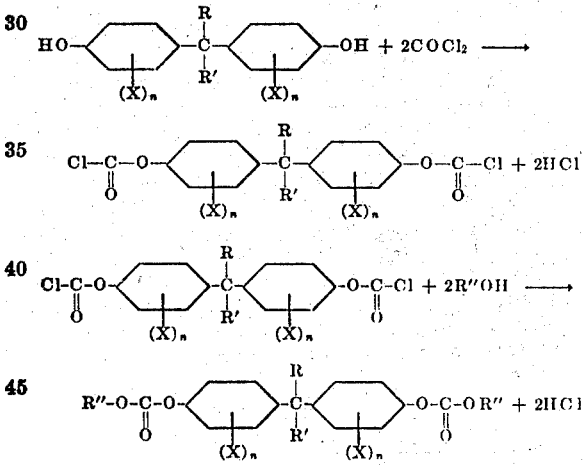

The diesters may also be formed by reacting the phosgene first with the appropriate unsaturated alcohol to form an ester of chloroformic acid followed by reacting two molecular proportions of this ester with one molecular proportion of the halogenated bis-phenol, as shown in the following equation:

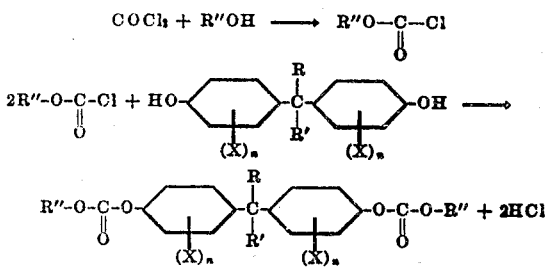

A third method comprises mixing together simultaneously all three reagents—the halogenated bis-phenol, the phosgene, and the unsaturated alcohol, the relative molecular proportions being 1:2:2. All of these reactions involving phosgene or esters of chloroformic acid are carried out at moderate temperatures in order to avoid the formation of undesirable by-products, preferably at a temperature below about 60° C., and more particularly about 0 to 10° C. It is unnecessary to employ an excess of any of the reagents above the amount theoretically necessary for the reaction, but a slight excess up to 10% by weight or more accelerates the completion of the reaction. Solvents which are relatively inert to the reactants, such as acetone, ether, benzene or the like, may be employed as the reaction medium, although in many cases no solvent at all is necessary. It has been found that the second step of the reaction, that is, the reaction between the ester of chloroformic acid and the alcohol or bis-phenol, is greatly accelerated by the use of a strong base, which aids in the elimination of hydrogen chloride from the reactants. Bases such as sodium hydroxide, potassium hydroxide, as well as organic materials such as pyridine, quinoline, or the like are suitable materials for this purpose.

Because of the ease of separating the desired products from the unreacted reagents or from possible by-products, it is preferred to carry out the reaction by first reacting the phosgene with the unsaturated alcohol to produce the chloroformic acid ester, followed by reaction of this ester with the halogenated bis-phenol in an alkaline medium.

The unsaturated alcohols which may be employed to form the esters of this invention include any alkenol having a methylene group attached by a double bond to a carbon atom. Among such materials are the following: allyl alcohol, methyl vinyl carbinol, allyl carbinol, vinyl ethyl carbinol, methyl allyl carbinol, beta-allyl ethyl alcohol, beta-methyl allyl alcohol, beta-ethyl allyl alcohol, and the like. The esters of these alkenols with chloroformic acid may be made by reacting the alcohol with phosgene as described by Schving et al., Bull. Soc. Chim. 43, 857-9 (1928).

Best results have been obtained with products prepared from allyl or beta-alkyl allyl alcohols. For that reason, a preferred class of the esters of this invention includes those having the structure

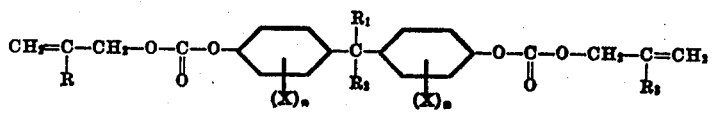

in which R, R₁, R₂, and R₃ are hydrogen or alkyl groups, X is a halogen atom, and $n$ is an integer less than 5.

The following specific examples are intended to illustrate more fully the nature of the invention, but are not to be construed as a limitation upon the scope thereof.

Example I

Gaseous chlorine was passed into a solution of 100 parts by weight of 2,2-bis-(4-hydroxyphenyl) propane in 525 parts by weight of glacial acetic acid for a period of about 30 minutes, while maintaining the temperature of the reaction mixture at about 35° C. At the end of this time, a total of 50 parts by weight of chlorine had been introduced into the reaction mixture. The product was then precipitated by pouring the mixture into ice water. The solid material, which consisted chiefly of 2,2-bis-(3-chloro-4-hydroxyphenyl) propane, was recrystallized from chloroform, appearing in the form of large crystals having a melting point of 65 to 70° C.

The more highly chlorinated compound 2,2-bis-(3,5-dichloro-4-hydroxyphenyl) propane, may be prepared by following a similar procedure using 100 parts by weight of chlorine instead of 50. This product has a melting point of about 132° C.

Example II

To a solution of 100 parts by weight of 2,2-bis-(4-hydroxyphenyl) propane in 500 parts of glacial acetic acid, there were added over a period of about one hour with constant stirring about 300 parts of bromine while maintaining the temperature of the reaction mixture at about 24° C. The product, 2,2-bis-(3,5-dibromo-4-hydroxyphenyl) propane, separates from the reaction mixture, upon standing, in the form of a solid, crystalline mass. After recrystallization from acetic acid, it has a melting point of about 160 to 161° C.

Example III

To a solution of 445 parts by weight of 2,2-bis-(3-chloro-4-hydroxyphenyl) propane and 371 parts of allyl chloroformate in 400 parts of acetone, there was added slowly and with constant stirring a solution of 128 parts of sodium hydroxide in 300 parts of water, while maintaining the temperature of the reaction mixture at about 0 to 10° C. An additional 550 parts of water were added during the course of the reaction to dissolve the sodium chloride formed. The mixture was stirred for about two hours after the last of the sodium hydroxide solution had been added in order to insure completion of the reaction. The acetone solution was then separated from the aqueous salt solution, washed with a solution of 175 parts of sodium chloride in 850 parts of water, and dried. The acetone was evaporated at reduced pressure leaving 669 parts (96% of the theoretical amount) of the desired 2,2-bis-(3-chloro-4-allyl-carbonato-phenyl) propane of the structure

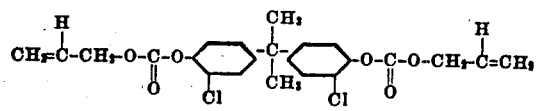

Example IV

To a solution of 324 parts by weight of 2,2-bis-(3,5-dichloro-4-hydroxyphenyl) propane and 290 parts by weight of allyl chloroformate in 1200 parts of acetone there was added slowly and with continuous stirring a solution of 97 parts by weight of sodium hydroxide in 600 parts of water, while maintaining the temperature of the reaction mixture between about 0 and 10° C. The mixture was stirred for about two hours after the addition of the sodium hydroxide solution was complete in order to insure completion of the reaction. The acetone layer was then separated from the aqueous salt solution, washed with an aqueous salt solution, and dried. The acetone was then removed by heating the solution at reduced pressure, leaving as the product 460 parts (97.3% of the theoretical yield) of a yellow, crystalline solid, melting at 93 to 98° C., which was identified as 2,2-bis-(3,5-dichloro-4-allyl-carbonato-phenyl) propane of the structure

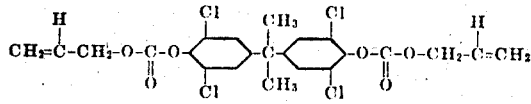

Example V

To a solution of 894 parts by weight of 2,2-bis-(3,5-dibromo-4-hydroxyphenyl) propane and 400 parts of allyl chloroformate in 2400 parts of acetone, there was added slowly and with continuous stirring a solution of 136 parts of sodium hydroxide in 1000 parts of water, while maintaining the temperature of the mixture at 0 to 10° C. After the addition of the sodium hydroxide solution, which required about one hour, had been completed, the mixture was stirred for an additional two and one-half hours. The product, which separates in the form of a white, crystalline solid, was separated from the mixture by filtration, washed with water, and dried. There were obtained 1100 parts (94% of the theoretical yield) of a material melting at 107 to 109° C., which was identified as 2,2-bis-(3,5-dibromo-4-allyl-carbonato-phenyl) propane of the formula

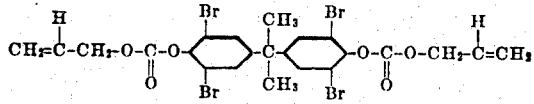

Other similar esters within the scope of this invention may be prepared by similar procedures, starting with the appropriate unsaturated alcohol and halogenated bis-phenol.

The unsaturated esters of this invention may readily be polymerized by any of the methods commonly used for the polymerization of unsaturated materials. Any of the usual catalysts, such as per-compounds, actinic light, etc., may be employed to accelerate the polymerization process. Best results have been obtained by using as a catalyst an organic peroxide such as diacetyl peroxide, acetyl benzoyl peroxide, dibenzoyl peroxide, dicaprylyl peroxide, di-o-chlorobenzoyl peroxide, ditoluyl peroxide, and the like. Although the polymerization may be carried out in solution or in aqueous emulsion, it is preferred, when the material is used as a molding compound, to carry out the polymerization merely by dissolving a suitable amount of catalyst (from 0.05 to about 5% by weight or more) in the monomeric diester, placing the material in a mold, and allowing it to remain there until polymerization is complete. The reaction may be accelerated, of course, by heating the mixture moderately, that is, to a temperature below about 150° C., preferably to a temperature of 60° to 100° C. It has been found that the polymerization reaction tends to be inhibited by the presence of atmospheric oxygen, and for that reason it is preferred to carry out the polymerization in a closed container from which substantially all of the atmospheric oxygen has been removed. Because of the extremely low shrinkage attendant upon the change from the monomeric to the polymeric condition of these diesters, objects may be molded very accurately to required dimensions. Moreover, the molded product is free from strains and flaws. For example, there was dissolved in the diester described in Example 3 about 3% by weight of di-ortho-chlorobenzoyl peroxide, and the solution was placed in a glass tube. The gas dissolved in the monomeric material was removed at reduced pressure, the atmosphere in the tube was replaced with nitrogen, and the tube was sealed. After the mixture had remained for a few hours at room temperature, it was heated at 60° C. for four hours to form a clear, flawless, polymer, having a Barcol Impressor hardness of 33. Similar results may be obtained with other unsaturated diesters falling within the scope of the invention.

Although specific examples of the invention have been herein described, it is not intended to limit the invention solely thereto, but to include all of the obvious variations and modifications falling within the spirit and scope of the appended claims.

We claim:

1. A nuclear chlorinated 4,4'-bis-(allyl carbonato) diphenyl alkane in which from 1 to 4 chlorine atoms are attached to each phenyl group and each phenyl group is attached to the same carbon atom of the alkane, the alkane being one containing no more than 7 carbon atoms.

2. A nuclear brominated 4,4'-bis-(allyl carbonato) diphenyl alkane in which from 1 to 4 bromine atoms are attached to each phenyl group and each phenyl group is attached to the same carbon atom of the alkane, the alkane being one containing no more than 7 carbon atoms.

3. A nuclear halogenated 4,4'-bis-(alkenyl carbonato) diphenyl alkane in which the alkenyl radical is one possessing from 3 to 5 carbon atoms, having at least 1 hydrogen atom attached to the connecting carbon atom, and containing a methylene group attached by a double bond to a carbon atom, in which from 1 to 4 halogen atoms of the class consisting of chlorine and bromine are connected to each phenyl group, and in which each phenyl group is attached to the same carbon atom of the alkane, the alkane being one containing no more than 7 carbon atoms.

4. The method of producing a nuclear chlorinated 4,4'-bis-(allyl carbonato) diphenyl alkane which comprises reacting at a temperature of about 0 to 60° C., two moles of phosgene with (a) two moles of an allyl alcohol and with (b) one mole of a nuclear chlorinated 4,4'-dihydroxy diphenyl alkane in which from 1 to 4 chlorine atoms are directly attached to each phenyl group and each phenyl group is attached to the same carbon atom of the alkane, the alkane being one containing not more than 7 carbon atoms.

5. The method of producing a nuclear halogenated 4,4'-bis-(alkenyl carbonato) diphenyl alkane which comprises reacting at a temperature of about 0 to 60° C., two moles of phosgene with (a) one mole of a 4,4'-dihydroxy diphenyl alkane in which from 1 to 4 halogen atoms selected from the class consisting of chlorine and bromine are directly attached to each phenyl group and each phenyl group is attached to the same carbon atom of the alkane, the alkane being one containing no more than 7 carbon atoms, and with (b) two moles of an alkenol containing from 3 to 5 carbon atoms, having at least one hydrogen atom attached to the carbon atom connected to the hydroxyl group and containing a methylene group attached by a double bond to a carbon atom.

6. A polymer of 2,2-bis-(3-chloro-4-allyl-carbonato-phenyl) propane, said polymer being a hard, non-thermoplastic, solid, resinous material.

7. A polymer of 2,2-bis-(3,5-dichloro-4-allyl-carbonato-phenyl) propane, said polymer being a hard, non-thermoplastic, solid, resinous material.

8. A polymer of a nuclear halogenated 4,4'-bis-(alkenyl carbonato) diphenyl alkane as defined in claim 3, said polymer being a hard, non-thermoplastic, resinous, solid material.

9. The method of producing a hard, non-thermoplastic, solid, resinous material which comprises admixing 2,2-bis-(3-chloro-4-allyl-carbonato-phenyl) propane with from 0.05 to 5% by weight of an organic peroxide and heating the resulting mixture, in the absence of atmospheric oxygen, to a temperature of 60 to 100° C.

10. The method of producing a hard, non-thermoplastic, solid, resinous material which comprises admixing a nuclear chlorinated 4,4'-bis-(allyl carbonato) diphenyl alkane, as defined in claim 1, with from 0.05 to 5% by weight of an organic peroxide and heating the resulting mixture, in the absence of atmospheric oxygen, to a temperature of 60 to 100° C.

11. The method of producing a hard, non-thermoplastic, resinous, solid material which comprises admixing a nuclear halogenated 4,4'-bis-(alkenyl carbonato) diphenyl alkane, as defined in claim 3, with from 0.05 to 5% by weight of an organic peroxide and heating the resulting mixture, in the absence of atmospheric oxygen, to a temperature of 60 to 100° C.

12. 2,2 - bis - (3 - chloro - 4 - allyl - carbonato-phenyl) propane.

13. 2,2-bis-(3,5 - dichloro - 4-allyl-carbonato-phenyl) propane.

14. 2,2-bis-(3,5 - dibromo - 4-allyl-carbonato-phenyl) propane.

JAMES A. BRALLEY.
FRANK B. POPE.

REFERENCES CITED

The following references are of record in the file of this patent:

UNITED STATES PATENTS

| Number | Name | Date |
|---|---|---|
| 2,370,571 | Muskat et al. | Feb. 27, 1945 |
| 2,385,932 | Muskat et al. | Oct. 2, 1945 |